Jan. 2, 1962 K. W. TUTTLE ET AL 3,015,182
POWER CASTING DEVICE
Filed Sept. 2, 1958

*INVENTORS*
KENNETH W. TUTTLE
BY PAUL GAMMILL, JR.

Paul B. File
PATENT AGENT

3,015,182
POWER CASTING DEVICE

Kenneth W. Tuttle and Paul Gammill, Jr., Santa Cruz, Calif., assignors of one-fifth to Robert H. Darrow, Santa Cruz, Calif.
Filed Sept. 2, 1958, Ser. No. 758,453
1 Claim. (Cl. 43—19)

The present invention relates generally to article propulsion and more particularly to a power casting device for fishing lures or other line-attached articles.

Briefly, conventional casting of a fishing hook or lure is a manual operation; the fisherman swings the fishing pole in a large arc, releasing the fishing hock and attached line for flight substantially at the terminus of the swing. Neither the casting accuracy nor distance attainable is too great since these factors are limited by the capabilities of the fisherman.

Accordingly, it is a general object of the present invention to provide a power casting device adapted by way of example for use with conventional fishing equipment to assist the fisherman in the attainment of greater distance and accuracy of casting.

It is a feature of the invention to provide a projectile adapted for attachment to the fishing line and capable of propulsion through the agency of a propellant, such as compressed carbon dioxide.

More particularly, it is a feature to provide such a projectile which can be used with conventional gas-propellant guns and is capable of temporary storage of compressed gas whose release during flight materially increases the distance attainable.

Additionally, a feature of the invention is the provision of a power casting device whose initial installation is simple and inexpensive and whose use is economically feasible.

Figure 1:
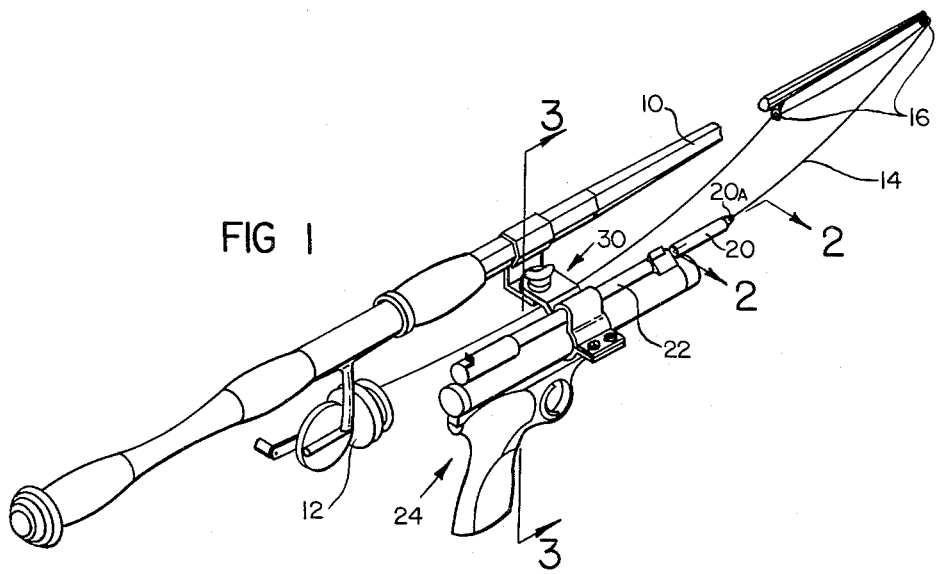
Figure 2:
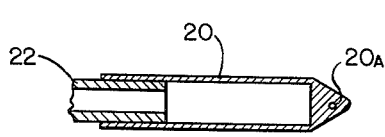
Figure 3:
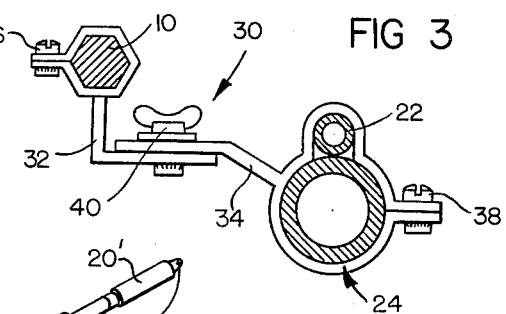
Figure 4:
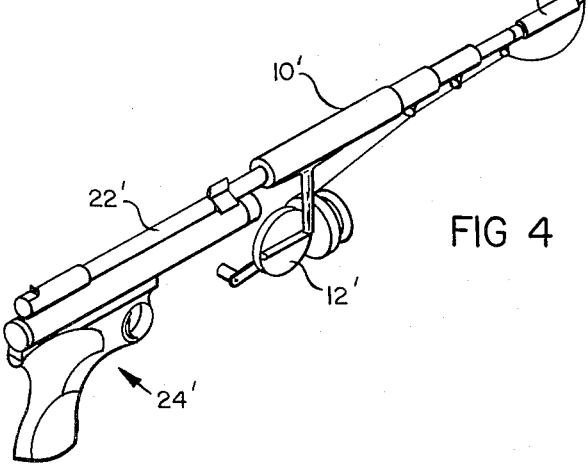

These as well as other objects and features of the invention will become more apparent from the following description of the accompanying drawing wherein:

FIG. 1 is a perspective view of a power casting device embodying the present invention and illustrated in association with a conventional fishing pole and line, FIG. 2 is a fragmentary sectional view taken along line 2—2 of FIG. 1 illustrating certain details of the arrangement, FIG. 3 is a sectional view taken along line 3—3 of FIG. 1 showing yet other details of the structure, and FIG. 4 is a perspective view of a modified embodiment of the invention.

With initial reference to FIG. 1, a power casting device embodying the present invention is illustrated in conjunction with a conventional fishing pole 10 having a spinning reel 12 mounted thereon. From the reel 12, a fishing line 14 extends through a series of grommets 16 on the pole and has secured to its extremity suitable fish hooks, lures, sinkers, and the like (not shown), as conventionally employed by fishermen.

Generally, in accordance with the present invention, the power casting device includes a projectile 20 connected to the fishing line 14 adjacent its end together with means for propelling such projectile with the attached line to the place in the stream, lake or ocean deemed most likely by the fisherman to result in a successful fishing effort.

More particularly, and with added reference to FIG. 2, the projectile 20 is of elongated, cup-shape having an eyelet 20A formed at one end thereof for connection to the fishing line 14. As clearly illustrated in FIG. 2, the cup-shaped projectile 20 is dimensioned at its open end for frictional engagement with the exterior of the muzzle 22 of a gas-propellant gun 24 which constitutes the specific form of propelling means illustrated for exemplary purposes.

This type of gun, commonly known as a "pell-gun" is a commercially available unit, being manufactured by Crossman, Benjamin and others so that the details thereof will not be described. For explanatory purposes, such guns include a cartridge of compressed carbon dioxide, a variable quantity of which is released upon pulling the trigger of the gun, such compressed gas then normally expanding to propel a small projectile or pell placed within the gun barrel. In the present application, such compressed gas, upon its release, expands forwardly through the barrel of the gun 24 and into the cup-shaped projectile 20 mounted over its muzzle end 22. The cup-shaped projectile establishes sealing relationship with the muzzle 22 of the gun so that the released carbon dioxide is confined to the interior of the gun barrel and the cup-shaped projectile thereon until pressure sufficient to overcome the frictional engagement between the muzzle and projectile is experienced to dislodge the latter. The cup-shaped projectile 20, having substantial volume, contains, upon leaving the muzzle 22, a predetermined amount of carbon dioxide still under pressure which then exhausts itself during the flight of the projectile from the rearwardly facing end of the cup to thus effect a jet-like propulsion thereof. The volumetric capacity of the cup-shaped projectile 20 for optimum results will vary with the particular propelling means employed, and more particularly, with the caliber of the gas-propellant gun 24, as specifically described herein.

Preferably, the gun 24 is mounted detachably on the fishing pole 10. As best shown in FIGS. 1 and 3, a two-piece bracket 30 is employed for such mounting. One arm 32 of the bracket 30 includes an opening dimensioned to accommodate the fishing pole 10 therewithin and a suitable clamping screw 36 is employed to secure this arm 32 of the bracket rigidly to the pole. The second arm 34 of the bracket is similarly provided with an opening for encompassment of the intermediate portion of the gun barrel and mounts a clamping screw 38 to make this connection a rigid one. The two arms 32, 34 of the bracket are provided with flat mating surfaces connected by a pivotal screw connection 40 which enables adjustment of the gun barrel relative to the fishing pole. The detachable mounting of the gun 24 on the pole 10 is conveniently made at a position such that one hand of the fisherman has access to the gun while the other hand can operate the fishing reel 12 in the normal fashion. To facilitate such manual access to the gun 24 and ultimately the support of the fishing pole 10, the bracket 30 preferably extends downwardly and slightly to one side of the fishing pole in the manner clearly illustrated in FIG. 3.

In use, a fisherman places the projectile 20 over the gun muzzle 22, as illustrated in FIG. 1, presets the amount of carbon dioxide to be released upon actuation of the gun trigger, and then after aiming the pole 10 and gun 24 in the direction desired for ultimate placement of the fishing hook, the spinning reel 12 is released to allow free dispensation of line therefrom and the trigger is pulled. The released carbon dioxide travels through the barrel of the gun 24 to eventually build up sufficient pressure within the interior of the cup-shaped projectile 20 to dislodge the same and instigate its flight. After the projectile 20 has been dislodged, the carbon dioxide remaining therein under pressure is discharged from the rear open end of the projectile to sustain such flight until completely discharged, whereupon continued flight is experienced for a distance dependent upon the attained velocity. As the projectile 20 moves through the air and eventually falls into the water, the fishing line 14 plays out along therewith providing substantially no drag on the flight of the projectile since the line dispenses freely from the spinning reel 12 and through the grommets 16 on the pole 10. The fishing may now proceed in the normal fashion until the projectile 20 is reeled in, whereupon another cast is made in substantially the same fashion described immediately above.

It will be appreciated that the projectile 20, itself, can be in the form of a lure with a hook attached thereto, or such projectile may merely serve as a sinker and a separate hook and/or lure can be employed in conjunction therewith.

A slightly modified embodiment of the invention is illustrated in FIG. 4 wherein like numerals with an added prime notation are employed to designate like parts. Precisely the same type of projectile 20' is employed, but the gun 24' has an elongated barrel 22' for reception of a telescopic fishing pole 10' on its exterior. The device is operated in the fashion described in connection with the first embodiment of the invention and then the pole 10' may be telescopically extended, if desired, to facilitate the imparting of action to the lure or fish hook in the water. This telescopic arrangement particularly enhances the ability to store or transport the equipment in its collapsed condition, as illustrated.

Quite obviously, other modifications and/or alterations can be made without departing from the spirit of the invention, and the foregoing description of two embodiments thereof is to be considered purely as exemplary and not in a limiting sense; and the scope of the invention is to be indicated by reference to the appended claim.

What is claimed is:

A power casting device associated with a fishing pole and line which comprises a generally cup-shaped projectile adapted for connection to the free end of the fishing line, a gas-propellant gun having a muzzle arranged to releasably mount said projectile, and bracket means mounting said gun on the fishing pole for pivotal adjustment about an axis substantially perpendicular to the longitudinal axis of the fishing pole to thereby enable adjustment of the gun muzzle direction relative to that of the fishing pole.

References Cited in the file of this patent

UNITED STATES PATENTS

| | | |
|---|---|---|
| 348,849 | Ingersoll | Sept. 7, 1886 |
| 1,124,726 | Gray | Jan. 12, 1915 |
| 2,305,176 | Littman | Dec. 15, 1942 |
| 2,671,289 | McCullough | Mar. 9, 1954 |
| 2,723,656 | Andina | Nov. 15, 1955 |
| 2,795,884 | Wright | June 18, 1957 |
| 2,924,211 | McSwain | Feb. 9, 1960 |
| 2,952,091 | Blanchard | Sept. 13, 1960 |

FOREIGN PATENTS

| | | |
|---|---|---|
| 323,459 | Great Britain | Jan. 2, 1930 |